Feb. 7, 1967  R. G. PATTERSON ET AL  3,303,261
FIRE DETECTOR ASSEMBLY
Filed Nov. 12, 1964  2 Sheets-Sheet 2
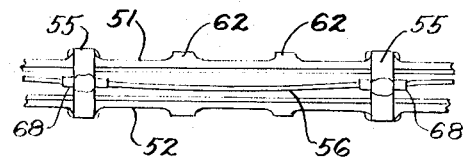
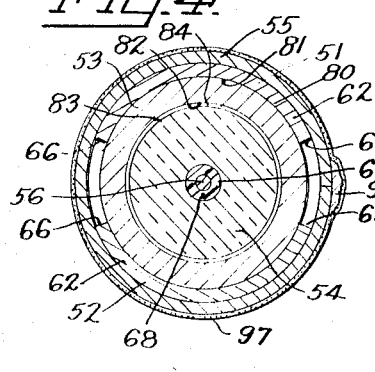
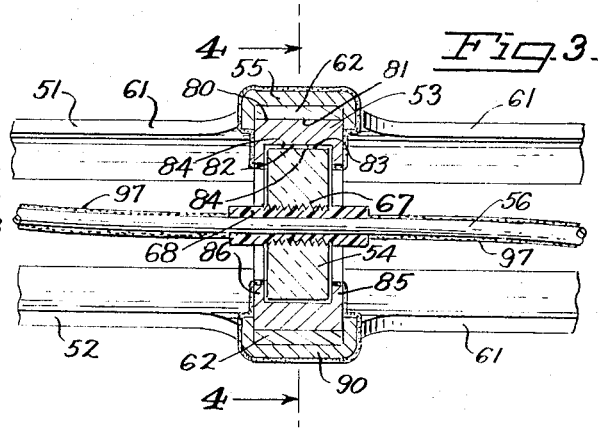
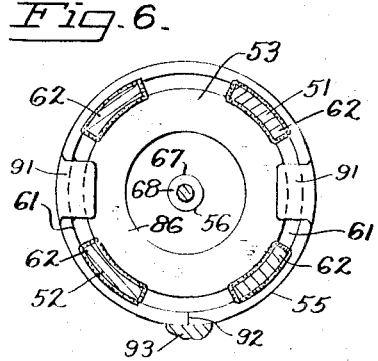
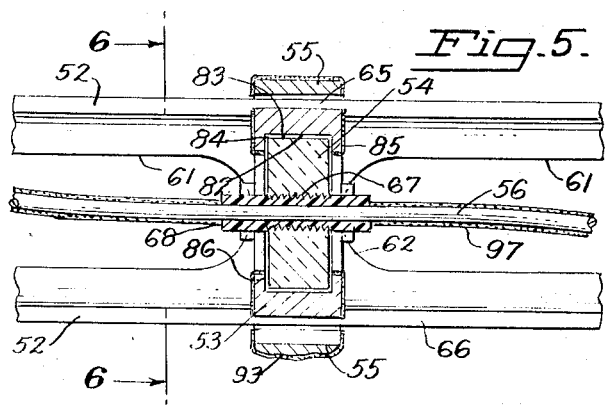
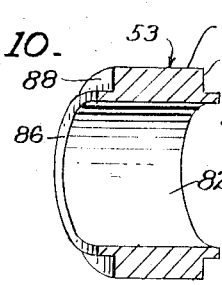
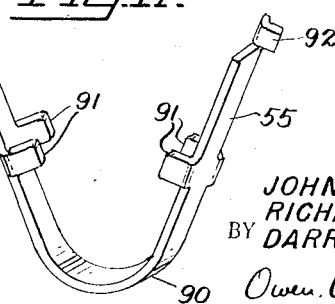
INVENTORS
JOHN E. LINDBERG
RICHARD G. PATTERSON
BY DARREL V. McCOY
Owen, Wickersham & Erickson
ATTORNEYS

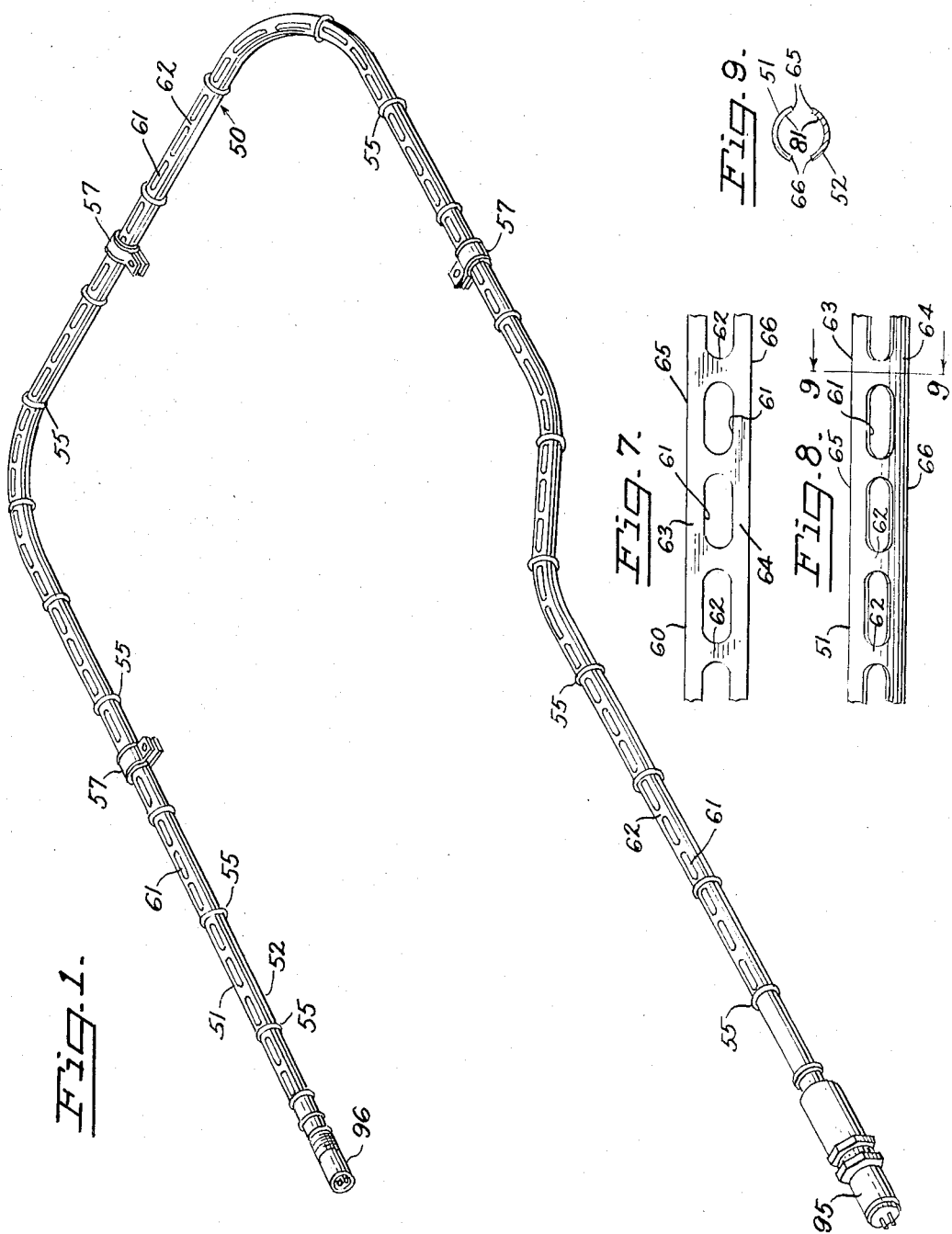

United States Patent Office 3,303,261
Patented Feb. 7, 1967

3,303,261
FIRE DETECTOR ASSEMBLY
Richard G. Patterson, Walnut Creek, Calif.; John E. Lindberg, 1211 Upper Happy Valley Road, Lafayette, Calif. 94549; and Darrel V. McCoy, Oakland, Calif., said McCoy and said Patterson assignors to said Lindberg
Filed Nov. 12, 1964, Ser. No. 410,635
18 Claims. (Cl. 174—1)

This invention relates to an improved installation of filamentary devices, such as the installation in aircraft of a fire detector sensor.

Several knotty problems relating to installation of filamentary devices are solved by this invention, the problems being discussed herein as they relate to fire-detector installation, since these will serve as a specific example where the invention, though not confined thereto, is especially useful.

For one reason or another, fire detecting sensor filaments usually require insulation from the structure on which they are installed. Some have electrical conductors vital to their operation; others, though not electrically actuated, have integrity test systems employing an exterior electrically conductive member, such as a stainless steel tubing which is heated electrically to cause test actuation. All these require insulation from ground, that is, from the airplane or other structure in which they are installed. Yet, such typical and well-known insulators as rubber, synthetic rubber, and even so-called high-temperature plastics are useless because the sensor filaments must be subjected to temperatures far beyond what those insulators can stand; those insulators break down at temperatures well below those to which such sensors are subjected and volatilize or burn or flow away, leaving the device uninsulated. Ceramics, while able to stand the temperatures, are subject to breakage and cannot be used as continuous tubes around the fire detector filament because of their inability to be bent to follow irregular insulation paths and because vibration and shock would soon break these continuous ceramic insulators; moreover, they would insulate the sensor filament from heat and slow its response rate.

Any installation that results in substantially delaying the response of the sensor to fire is undesirable. Shielding tubes and the like of any conventional structure are therefore out of the question. The sensor support device should provide electrical insulation but not substantial insulation from the heat which the sensor is supposed to detect.

A further problem: continuous filamentary fire detectors tend to suffer fatigue failures when installed in aircraft engines, wheel walls, baggage compartments and elsewhere on airplanes, due to the incompatibility of the suspension system with the local environmental vibration conditions.

It is thus important to provide sufficient vertical and horizontal flame path areas while supporting and electrically insulating the filament and yet to retain a sufficiently rigid structure which can be routed in any plane at rather short bend radii and while supporting the filament at rather closely spaced intervals so that the distances between supports is out of the resonant frequency range for the airplane installation.

How these and other problems are met by the invention and what other advantages are possessed by the invention, will all appear from the following description of a preferred embodiment thereof.

In the drawings:

FIG. 1 is an isometric view of a sensor installation assembly embodying the principles of the invention.

FIG. 2 is an enlarged fragmentary view in elevation of a portion of the assembly of FIG. 1.

FIG. 3 is a further enlarged fragmentary view in elevation of a portion of the assembly of FIG. 2.

FIG. 4 is a view in section taken along the line 4—4 in FIG. 3.

FIG. 5 is a view similar to FIG. 3, taken 90° therefrom.

FIG. 6 is a view in section taken along the line 6—6 in FIG. 5.

FIG. 7 is a plan view of one of the two strips from which the outer tube-like member is made, shown flat before bending.

FIG. 8 is a view like FIG. 7 of the strip of FIG. 7 after having been formed to an arcuate shape.

FIG. 9 is a view in section of two such strips, taken along the line 9—9 in FIG. 8, as they will later be assembled.

FIG. 10 is a view partly in perspective and partly in section of one of the metal support annuli before installation of the ceramic insulating disc.

FIG. 11 is a view in perspective of one of the strap clamp members just before installation.

The installation assembly 50, shown in FIG. 1, includes (1) a pair of identical strips 51 and 52, arcuate in cross section, (2) a series of rigid metal annuli 53 (see FIGS. 3–6), (3) a ceramic insulating disc 54 in many or all of the annuli 53, and (4) a series of clamping straps 55 for holding the assembly 50 together. These elements cooperate to support, insulate, and protect a sensor filament 56, which may be a stainless steel tube containing gas and/or a filament of metallic hydride. The assembly 50 may itself be secured to an aircraft by means including fasteners 57.

Each strip 51, 52 (see FIGS. 7–9) may be made from a flat strip 60 of stainless steel, a portion of which is shown in FIG. 7. There are important advantages in punching out the strip 60 to provide a series of slots 61. The slots 61 are relatively wide, preferably more than ¼" wide to afford direct access by flame to the sensor 56, and the slots 61 are preferably several times as long as they are wide. Preferably they are uniform in size, providing equally spaced webs 62 joining side portions 63 and 64, which preferably have straight edges 65 and 66.

In the invention as shown in FIG. 1, these flat strips 60 are bent into the strips 51 and 52 to provide an arcuate shape. Each arcuate strip 51, 52 is a segment of a circle but is substantially less than a semicircle so that when the two are put together along a single circular arc, the edges 65 and 66 of the facing pair of strips 51 and 52 are spaced apart at least ⅒", usually only slightly smaller distance than the width of the slot 61, e.g., up to ¼".

The ceramic insulators 54 are preferably simple discs of high temperature ceramic with a central opening 67 through which the filament 56 is to pass. Preferably, the opening 67 is threaded to receive and retain an insulating sleeve 68, which may be made from fiber glass cloth impregnated with a high-temperature lacquer and need not be threaded exteriorly since it can be, in effect, threaded upon insertion in the opening 67. This sleeve 68 acts to retain the sensor tube 56 snugly without abrasion and wear. It is a problem to hold the strips 51 and 52 together by radially inward pressure without crushing or cracking the ceramic insulators 54. The present invention solves that problem by incorporating the annuli 53.

Each annulus 43 is preferably of stainless steel. Its cylindrical outer periphery 80 exactly matches the arc of the inner surface 81 of the strips 51 and 52. Preferably, but not always, it is positioned at a web 62. Its cylindrical inner periphery 82 is larger than the outer cylindrical periphery 83 of the ceramic disc 54, so that there is an initial clearance 84 between them. Moreover, the thickness between the inner and outer peripheries 80 and 82 is purposely made substantial, so that the annulus is quite rigid and does not tend to crease or give readily; so the annulus 53 is not a thin sleeve but a thick one.

When initially made, as in FIG. 10, the annulus 53 may have a pair of projecting thin-walled portions 85 and 86, each extending beyond its end face 87 or 88. When the ceramic disc 54 is centered in the annulus 53, these portions 85 and 86 may be forced down radially to encase the disc 54. They need not fit tightly against it.

With this structure, radial forces exerted inwardly against the annulus 53 are resolved by it without transferring the force to the disc 54.

The assembly 50 is held together by a series of annular clamps 55, which may be made from a stainless steel strap 90. The strap 90 may initially be flat, and may have ears or tabs 91 and partially severed end portions 92. The ears 91 may be bent in 90°, the end portions 92 bent out 90°, and the strap 90 itself shaped as shown in FIG. 11 before installation. The ears or tabs 91 are used to achieve an initial positioning or temporary assembly, by fitting on each side of one web 62 and of one annulus 53, as shown in FIGS. 3–6. They are not long enough to touch the filament 56.

The end portions 92 may be used to tighten the straps 55 around the assembly and then to weld the ends together by a weld 93. They are brought quite tight so that, when the ends 92 are welded together, the clamps 55 are really retained by their radially inward circumferentially distributed pressure on the strips 51 and 52 and, through them, to the annulus 53. Hence, the importance of the way to which the ceramic disc 54 is retained in the annulus 53. The ends 92 are welded to each other only—not to the strips 51, 52 nor to the annulus 53. This means that should it be necessary to remove or replace an installation, the clamp straps 55 may be cut in two, by pliers or by a torch, and the rest of the assembly is fully salvaged.

Instead of the strap 90 with its ears 91 and projections 92, a plain strap may be used, if desired, with not quite so easy handling.

As shown in FIG. 1, the ends of the assembly are not slotted and are secured, at one end, to a responder 95 or other suitable device and at the other end to a suitable receptacle 96.

In assembly, the sensor 56 may be strung with ceramic discs 54 like beads on a bead string, the discs 54 already having the sleeves 68 inserted into them and being already secured inside their annuli 53. The annuli 53 are then located relative to the strips 51 and 52, usually being less than three inches apart, to provide a distance short enough to be outside the resonant frequency range for the installation. Some annuli 53 may be located between webs 62, if desired, in order to provide support wherever needed, and some may be blanks, without discs 54 if needed when an insulator is not needed.

The strips 51 and 52 are preferably shaped by being bent before assembly, the bends preferably being in the plane of the edges 65, 66 rather than in the plane of the slots 61. Bends in the plane of the slots 61 are preferably achieved by welding together sections bent as usual but secured at 90° to the rest of the device. In any event, there is some resilience in every direction.

Insulation capable of standing high heat is achieved and, being confined to short portions, is not likely to be broken. The shell provided by the strips 51, 52 protects the sensor filament 56 from damage, yet it affords adequate entry for flame and does not appreciably slow response. Strength of support is provided and the frequent supports of the discs 54, with their sleeves 68, avoid vibration damage.

Insulation and protection may be augmented by spraying an insulator 97, such as high temperature lacquer, on the assembly 50, covering both the sensor 56 and the inner and outer surfaces of the strip 51 and 52 and other exposed surfaces.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A filament protecting assembly, including in combination:
   a pair of perforate metal strips, each shaped to provide a generally arcuate shape in cross section smaller than a semi-circle, said strips being disposed opposite each other and spaced apart by lengthwise-extending gaps to provide a generally circular cross section, each said strip having a plurality of lengthwise-extending slots, said gaps and slots being large to provide gross free-flow of air therethrough,
   a series of disc-shaped insulators, each having a central opening,
   a series of metal annuli for containing each insulator loosely in one said annulus, so that radially inward forces are resolved by said annulus without direct transmission to said insulator, said annuli being distributed along said strips inside them and between them,
   a series of metal locking members surrounding said strips and said annuli and holding them together, and
   a filament inside the area enclosed by said strips, passing through the openings through said insulators and supported by and insulated by said insulators.

2. The assembly of claim 1 wherein said filament is bowed out somewhat between discs to enable suitable expansion and contraction thereof in between each succeeding pair of discs.

3. The assembly of claim 2 wherein said filament is bowed in opposite directions between any two succeeding pairs of discs.

4. The assembly of claim 1 wherein the assembly is covered with a thin coating of insulating material.

5. The assembly of claim 1 wherein the central openings of said discs retain an insulating sleeve that tightly holds said filament.

6. The assembly of claim 5 wherein the sleeve is made from glass fiber cloth impregnated with high-temperature lacquer.

7. The assembly of claim 1 wherein said locking members comprise clamp straps held to said strips and said annuli by radially inward pressure and friction without direct attachment to them.

8. The assembly of claim 7 wherein said clamp straps include tabs bent in on opposite sides of said annuli.

9. The assembly of claim 7 wherein said clamp straps have interengaging ends that are welded together.

10. A fire detector assembly, including in combination:
    a pair of metal strips, each arcuate in cross section and smaller than a semicircle and having side edges and lengthwise-extending slots therethrough, said pair of strips facing each other and spaced apart by lengthwise-extending gaps to give a generally circular cross section, said slots and gaps enabling entry of flame and air from outside to inside the area enclosed by said strips,
    a series of insulators, each being disc shaped with a central opening,
    a series of metal annuli for containing each insulator loosely in an annulus, so that radially inward forces are resolved without direct transmission to said insulator, said annuli being distributed along said strips, inside them and between them and of the same arc,
    a series of metal clamp loops surrounding said strips and said annuli and holding them together, and
    a fire detector filament inside the area enclosed by said strips, passing through the openings through said insulators and supported by and insulated by said insulators.

11. The assembly of claim 10 wherein said filament is bowed out somewhat between discs to enable suitable expansion and contraction thereof in between each succeeding pair of discs.

12. The assembly of claim 11 wherein said filament is bowed in opposite directions between any two succeeding pairs of discs.

13. The assembly of claim 10 wherein the discs have their central openings threaded and fiber-glass sleeves are secured therein and tightly engage said filament.

14. A fire detector assembly, including in combination:
a pair of metal strips, each arcuate in cross section and smaller than a semicircle and having side edges and having a series of wide lengthwise-extending slots therethrough, said pair of strips facing each other and spaced apart from each other by wide lengthwise-extending gaps, to define a generally circular cross section, said slots and gaps enabling air and flame to pass through,
a series of insulators, each being disc shaped with a central opening,
a series of metal annuli for containing each insulator loosely in an annulus, so that radially inward forces are resolved without direct transmission to said insulator, said annuli being distributed along said strips, inside them and between them and of the same arc,
a series of metal clamp loops having interengaging ends that are welded together, surrounding said strips and said annuli and holding them together and held to them by radially inward pressure and friction, without direct attachment, and
a fire detector filament inside the area enclosed by said strips, passing through the openings through said insulators and supported by and insulated by said insulators.

15. A fire detector assembly, including in combination:
a pair of metal strips, each having a series of spaced apart webs that are arcuate in cross section and smaller than a semicircle and lengthwise members substantially narrower than said webs connecting successive said webs, and providing lengthwise-extending slots, said pair being disposed opposite each other and spaced apart from each other by lengthwise-extending gaps, with their webs aligned, so that said webs define a generally circular cross section,
a series of insulators, each being disc shaped with a central opening,
a series of metal annuli for containing each insulator loosely in an annulus, so that radially inward forces are resolved without direct transmission to said insulator, said annuli being distributed along said strips, inside said webs and between two opposite webs and of the same arc,
a series of metal locking members surrounding said webs and said annuli and locking them together so that they are held together only by said metal members, and
a fire detector filament inside the area enclosed by said strips, passing through the openings through said insulators and supported by and insulated by said insulators, said slots and gaps enabling access to said filament by the ambient air and flame from outside said assembly.

16. A fire detector assembly, including in combination:
a pair of stainless steel strips, each arcuate in cross section and smaller than a semicircle and having straight longitudinal edges and having a series of wide central slots whose length exceeds their width, between said edges, to provide a pair of edge portions joined by arcuate widthwise-extending webs at intervals, said pair being aligned so that their webs are opposite to and aligned with each other and so that said edges are spaced well apart from each other,
a series of stainless steel annuli spaced along said strips at suitable intervals and positioned between them each having a cylindrical outer periphery in contact with a said web of each of said pair and each having a cylindrical inner periphery and end faces with portions projecting radially inwardly beyond said inner periphery,
a ceramic disc in each of many said annuli, each having a central opening therethrough, an outer periphery smaller than the inner periphery of its said annulus, said disc being retained in said annulus by said projecting portions of said end faces, the clearance around its outer periphery protecting said disc from being crushed or broken when radially inward pressure is applied to its said annulus,
an insulating sleeve secured in each said central opening,
a series of annular stainless steel clamps, each surrounding a said annulus and compressed tightly against a said web of each of said strips and against said annulus, and holding said strips and annuli together, each clamp being a strap with its ends secured together and being unattached to said strips and annuli and discs, so that said clamps can be detached and removed and the remaining elements then taken apart, and
a fire detector filament extending through said disc central openings and supported by them by snug engagement with said sleeve,
whereby said slots and spacing of said edges enable ready access of fire to said filament and said discs insulate said filaments from said strips and annuli and clamps.

17. The assembly of claim 16 wherein said filament is bowed out somewhat between discs in opposite directions between any two succeeding pairs of discs, to enable suitable expansion and contraction thereof in between each succeeding pair of discs.

18. The assembly of claim 16 wherein said clamp straps include tabs bent in on opposite sides of said annuli and interengaging ends that are welded together only, so that the assembly can be disassembled when said strips are severed.

No references cited.

LEWIS H. MYERS, *Primary Examiner.*

J. F. RUGGIERO, *Assistant Examiner.*